US007249495B2

(12) United States Patent
Tsuyuguchi et al.

(10) Patent No.: US 7,249,495 B2
(45) Date of Patent: Jul. 31, 2007

(54) STROKE DETERMINATION SYSTEM FOR FOUR STROKE CYCLE ENGINE

(75) Inventors: Makoto Tsuyuguchi, Wako (JP); Kenichi Machida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/283,803

(22) Filed: Nov. 22, 2005

(65) Prior Publication Data

US 2006/0116813 A1 Jun. 1, 2006

(30) Foreign Application Priority Data

Nov. 30, 2004 (JP) ............................. 2004-346176

(51) Int. Cl.
*G01M 15/00* (2006.01)

(52) U.S. Cl. ..................................................... 73/117.3

(58) Field of Classification Search .................. 73/112, 73/115, 116, 117.2, 117.3, 118.1, 118.2
See application file for complete search history.

(56) References Cited

U.S. PATENT DOCUMENTS 6,170,322 B1 * 1/2001 Yamazaki et al. ......... 73/117.3
6,340,020 B2 * 1/2002 Yamazaki et al. .......... 123/478
6,378,358 B1 * 4/2002 Hirakata et al. ........... 73/117.3
6,932,057 B2 * 8/2005 Sawada et al. ........ 123/406.47
6,968,269 B2 * 11/2005 Yamashita .................. 701/114
2001/0010218 A1 * 8/2001 Yamazaki et al. .......... 123/486
2006/0218998 A1 * 10/2006 Machida et al. ........... 73/117.3

FOREIGN PATENT DOCUMENTS

JP 10-227252 8/1998

* cited by examiner

*Primary Examiner*—Eric S. McCall
(74) *Attorney, Agent, or Firm*—Westerman, Hattori, Daniels & Adrian, LLP.

(57) ABSTRACT

A system for performing stroke determination and cylinder determination by using intake pressure as a parameter, in order to provide a stroke determination system for a four stroke cycle engine by which accurate determination can be achieved.

14 Claims, 6 Drawing Sheets

STROKE DETERMINATION SYSTEM FOR FOUR STROKE CYCLE ENGINE

BACKGROUND OF THE INVENTION

The present invention relates to a stroke determination system for a four stroke cycle engine, particularly to a stroke determination system for a four stroke cycle engine which is suitable for determining the stroke of a multi-cylinder V-type engine having ignition timings at irregular intervals.

In a four stroke cycle engine adopting an electronic fuel injector, determination of the stroke has been carried out based on both the phase of a camshaft of the engine and the phase of a crankshaft. On the other hand, Japanese Patent Laid-open No. Hei 10-227252 proposes a stroke determination system in which the phase of the camshaft is not detected. The intake pressure detected this time in a specified phase of the crankshaft is compared with the intake pressure detected one period before, and determination of the stroke and determination of the cylinder are conducted according to the magnitude relationship between the two intake pressures. By this system, the need to dispose a sensor for detecting the phase of the camshaft, in the cylinder head of the engine, is eliminated, and it is made possible to achieve reductions in the size and weight of the engine.

In the above-mentioned related art, determination of the stroke and determination of the cylinder are performed based on the subtle magnitude relationship between the two values of intake pressure. In this case, the intake pressure depends not only on the stroke of the engine but also on the running condition, i.e., whether the present condition is an accelerating condition or not, or whether the present condition is a decelerating condition or not. Therefore, there has been the technical problem that, where it is intended to discriminate the stroke and the cylinder on the basis of only the intake pressure irrespectively of the running condition, a confirmation work by carrying out a multiplicity of actual machine tests is needed, leading to an increase in the number of development steps.

Further, there is also the technical problem that, where it is intended to compensate an actually measured value of intake pressure for a value in a standard condition on the basis of a lot of data obtained through actual machine tests, the arithmetic load on an ECU is increased.

SUMMARY OF THE INVENTION

It is an object of the present invention to solve the above-mentioned problems in the related art, and to provide a stroke determination system for a four stroke cycle engine, of the type of determining the stroke and the cylinder using the intake pressure as a parameter, wherein accurate determination is possible.

In order to attain the above object, the present invention is characterized by adopting the following means, in a system for determining the stroke of a multi-cylinder four stroke cycle engine having ignition timings at irregular intervals.

(1) A characteristic feature of the invention includes means for recording the variation pattern of intake pressure, means for determining the intake start timing of each cylinder on the basis of the variation pattern of the intake pressure, and means for determining the stroke on the basis of the corresponding relationship between the intake start timing of each cylinder and the phase of a crankshaft.

(2) Another characteristic feature of the invention includes the means for recording the variation pattern which records only the variation pattern of the intake pressure in a predetermined phase period of the crankshaft.

(3) Another characteristic feature of the invention includes recording increases and decreases in the intake pressure in the variation pattern on a time series basis.

(4) Another characteristic feature is that the means for determining the intake start timing determines the timing of change from the increase to the decrease of the intake pressure in the variation pattern.

(5) Another characteristic feature is that the engine is a V-type two-cylinder engine.

(6) Furthermore, another characteristic feature is that the means for determining the stroke includes means for comparing spark advances of the intake start timing, means for corresponding the intake start timing on one side to a predetermined stroke on the basis of the results of the comparison, and means for corresponding each phase in a two-period amount of the crankshaft to each stroke of the engine on the basis of the corresponding relationship between the intake start timing and the predetermined stroke. According to the present invention, the following effects are attained.

(1) According to the invention, determination of the stroke is performed by using as parameters not only the phase of the crankshaft but also the intake start timing of each cylinder, which can be obtained accurately and easily based on the intake pressure, and, therefore, the stroke of the multi-cylinder four stroke cycle engine having ignition timings at irregular intervals can be accurately determined while reducing the number of development steps and without increasing the arithmetic load on an ECU.

(2) Furthermore, only the intake pressure necessary for stroke determination is recorded, and the intake pressure unnecessary for stroke determination is not recorded, so that it is possible to reduce the arithmetic load on the ECU and the consumption of memory.

(3) Additionally, only the increases and decreases in intake pressure are recorded in a variation pattern on a time series basis, so that it is possible to reduce the memory consumption necessary for recording the variation pattern.

(4) Additionally, the intake start timing may be detected as an extremal value in the variation pattern of intake pressure, so that the intake start timing can be accurately determined based on the intake pressure.

(5) Still further, the intake start timing of each cylinder in the two-cylinder engine may be accurately detected while using only one intake pressure detecting means.

(6) Still further, the strokes of the two-cylinder engine may be accurately determined while using only one intake pressure detecting means.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
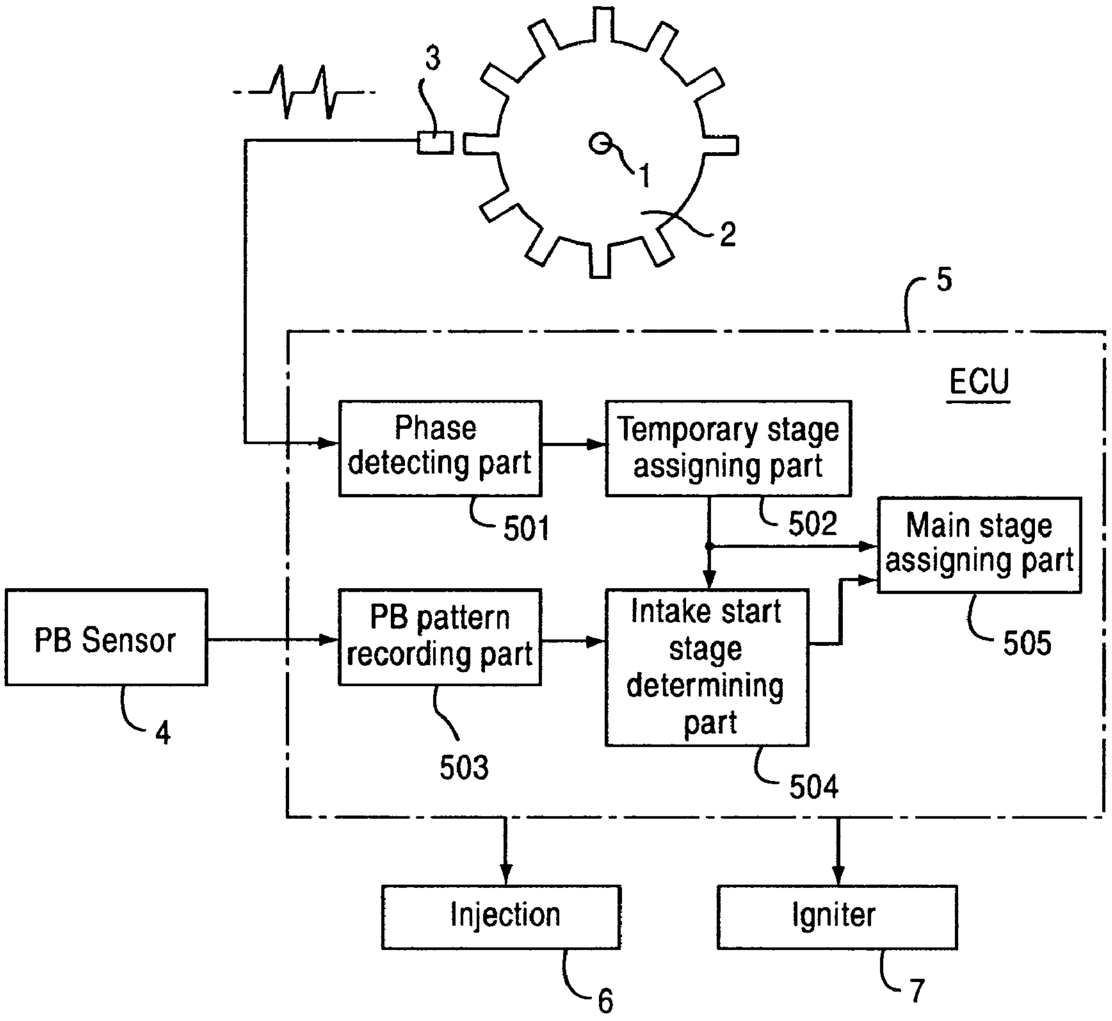
FIG. 1 is a block diagram of one embodiment of a stroke determination system for a four stroke cycle engine according to the present invention.

Now, some preferred embodiments of the present invention will be described in detail below referring to the drawings. FIG. 1 is a block diagram of one embodiment of a stroke determining system according to the present invention. Here, a stroke determination system to be applied to a V type two-cylinder engine having ignition timings at irregular intervals and a bank angle of 52° is taken as an example in the following description.

On a crankshaft 1, there are provided a crank pulser rotor 2 and a pulse generator 3 for outputting 11 crank pulses together with a pulse-missing portion per revolution. An intake pipe (not shown) communicated with each cylinder of an engine is provided with an intake pressure sensor 4 (hereinafter expressed as PB sensor) for detecting the pressure inside the intake pipe. The crank pulses and an output signal from the PB sensor 4 are inputted to an ECU 5, together with other sensor signals and process signals.

An ECU 5 (see FIG. 1) includes a phase detecting part 501 for detecting the phase of a crankshaft 1 based on crank pulses, a temporary stage assigning part 502 for assigning a temporary stage number to each phase (stage), a PB pattern recording part 503 for recording a variation pattern of intake pressure (PB value) detected by a PB sensor 4, an intake start stage determining part 504 for determining the intake start stage of each cylinder based on the PB value variation pattern at a pulse-missing position and the vicinity thereof, and a main stage assigning part 505 for assigning a main stage number in place of the temporary stage number to each stage based on the temporary stage assignment result and the intake start stage determination result.

In other words, the ECU 5 includes a phase detecting part 501 for detecting the phase of the crankshaft 1 on the basis of the crank pulses, a temporary stage assigning part 502 for dividing one period of the engine (i.e., two revolutions of the crankshaft) into 22 phases (stages) with the output timings of the crank pulses and assigning temporary stage numbers "0#" to "21#" to the phases (stages), a PB pattern recording part 503 for recording the variation pattern of the intake pressure (hereinafter expressed as PB value) detected by the PB sensor 4, an intake start stage determining part 504 for determining the intake start stages of the cylinders on the basis of the variation pattern of the PB value at the pulse-missing position and the vicinity thereof, and a main stage assigning part 505 for assigning main stage numbers in place of the temporary stage numbers to the stages on the basis of the results of assignment of the temporary stages and the results of determination of the intake start stages. The ECU 5 controls an injection 6 and an igniter 7 on the basis of the output timings of the crank pulses and the results of assignment of the main stages.

Now, a stroke determining process carried out by the ECU 5 will be described below, referring to the flowchart shown in FIG. 2 and the timing chart shown in FIG. 3. In the stroke determining process, the main stage numbers "0#" to "21#" are finally assigned to the 22 stages obtained by one period of the engine with the output timings of the crank pulses.

Figure 2:
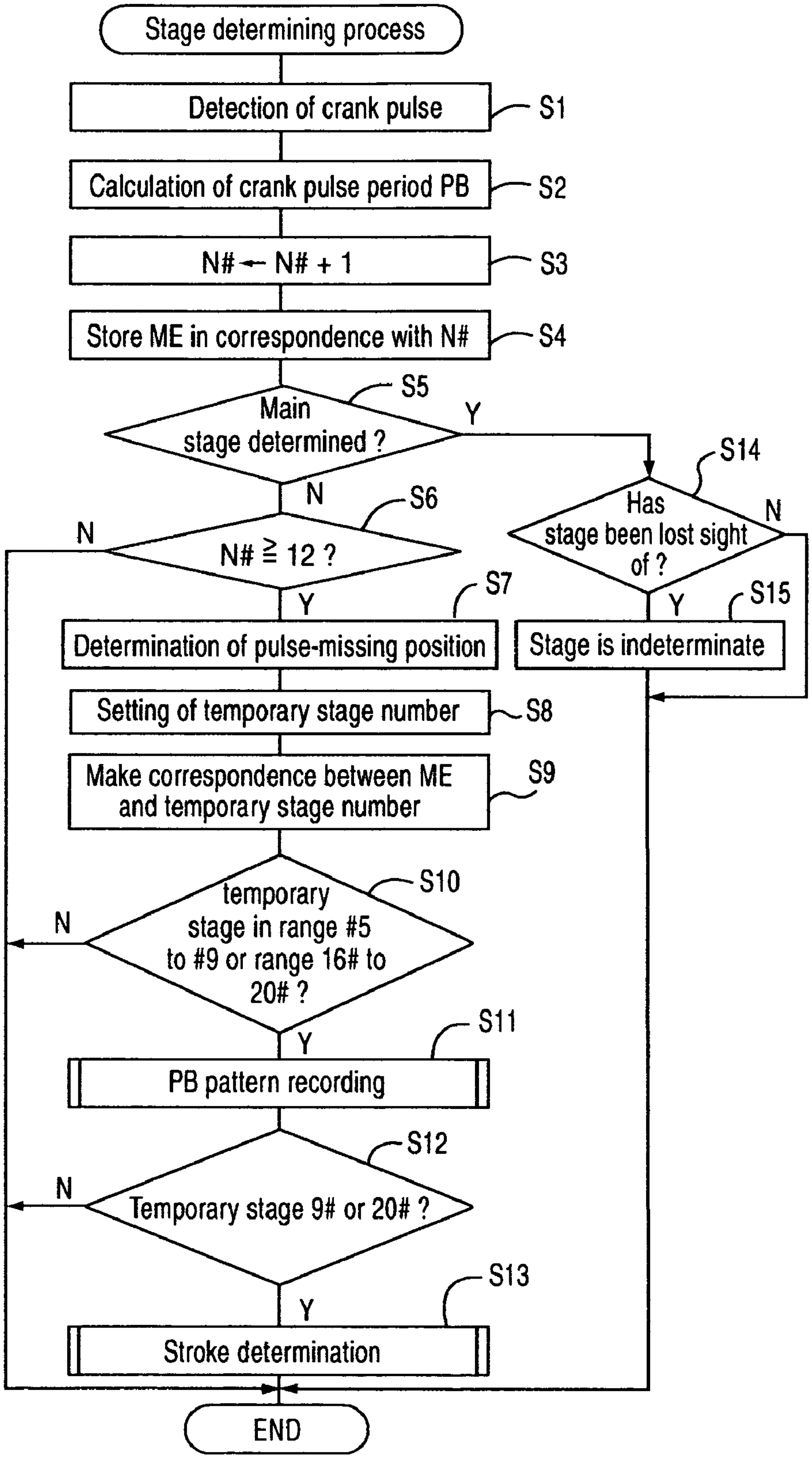
FIG. 2 is a flowchart showing the procedure of stroke determination.

When counting of the number of pulses of the crank pulser rotor 2 is started by the ECU 5, "stage determination process" (main flow) shown in the flowchart in FIG. 2 is started. When the crank pulse is detected in step S1, the period ME for this-time one stage amount of the crankshaft 1 is calculated by the phase detecting part 501 in step S2, based on the lapse of time Δt from the last-time pulse detection timing to the this-time pulse detection timing. In step S3, the count value (N#) in the stage counter is incremented. The stage counter counts the stage number repeatedly in the range of 0 to 21. In step S4, the this-time period ME is stored in the state of corresponding to the present count value.

In step S5, it is determined whether the main stages are determined or not. Since the main stages have not yet been determined here, step S6 is entered for assigning the temporary stages to the stages, prior to the determination of the main stages. In step S6, it is determined whether the count value of the stage counter this time is not less than "12#" or not. In the beginning, the count value is determined to be less than "12#", and the this-time stage determining process is finished.

Thereafter, the processes from step S1 to step S6 are repeated each time the crank pulse is detected, and when the count value is determined to be not less than "12#" in step S6, step S7 is entered. In step S7, the pulse-missing position is detected by the temporary stage assigning part 502. The pulse-missing position is determined as a stage corresponding to the period MEn at which the period MEn/MEn-1 calculated for each of adjacent stages shows the maximum. In this embodiment, as one example is shown in FIG. 3, the stage (phase) at which the count value is "5#" is determined to be the pulse-missing position.

In step S8, the temporary stage number is determined based on the count value "5#" at the pulse-missing position. Specifically, as shown in FIG. 3, either one of the two pulse-missing stage numbers "8#" and "19#" on the main stage (in this embodiment, "8#") is tentatively assigned to the pulse-missing stage at which the count value is "5#". Then, temporary stage number "9#" is assigned to the stage at which the count value is "6#", and temporary stage number "10#" is assigned to the stage at which the count value is "7#". It should be noted here that it is uncertain whether the pulse-missing stage corresponds to "8#" of the main stage or corresponds to "19#" of the main stage.

In step S9, the corresponding relationship between the count value and the period ME is changed into the corresponding relationship between the temporary stage number and the period ME. Specifically, the period ME at which the count value is "6#" is re-registered as the period ME at which the temporary stage number is "9#", and the period ME at which the count value is "7#" is re-registered as the period ME at which the temporary stage number is "10#".

When the assignment of the temporary stages is completed in this manner, it is determined in step S10 whether the temporary stage number assigned to the present stage belongs to the range "5#" to "9#" or belongs to the range "16#" to "20#". If the present stage belongs to neither of the temporary stage ranges, this-time process is finished. If the present stage belongs to either of the temporary stage ranges, step S11 is entered. In step S11, "PB pattern recording process" for recording a variation pattern related to the increase or decrease in PB value is carried out in the PB pattern recording part 503.

Figure 4:
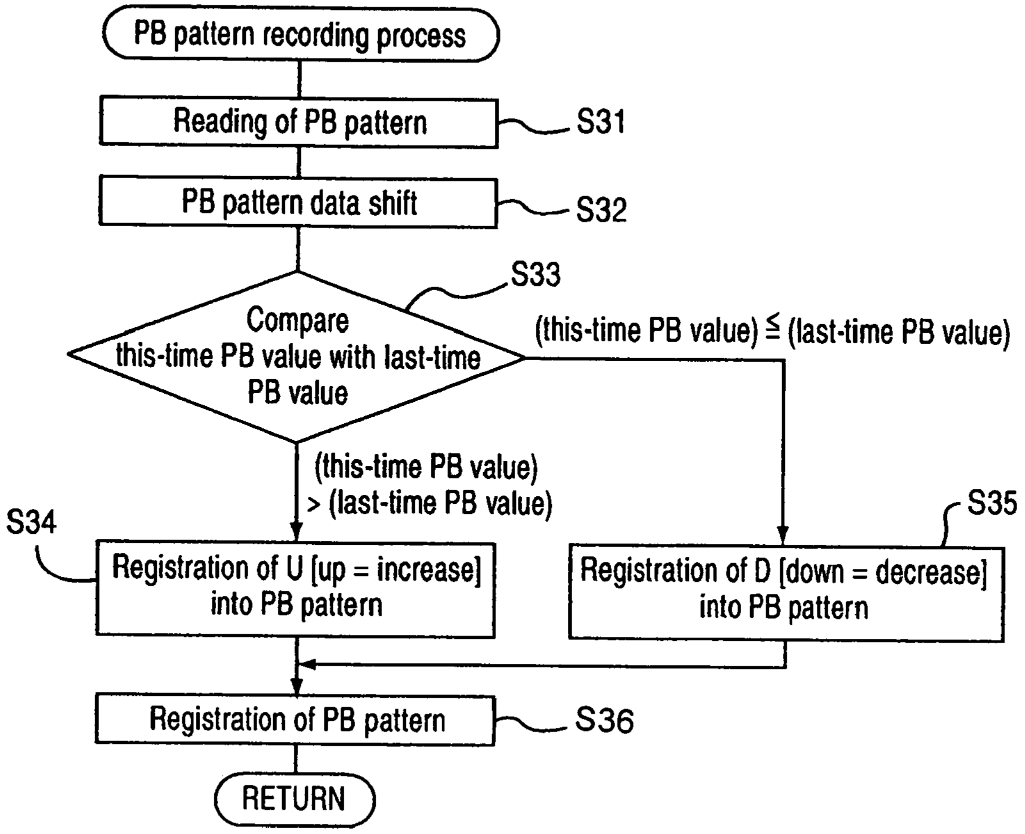
FIG. 4 is a flowchart showing the procedure of a "PB pattern recording process"
Figure 5:
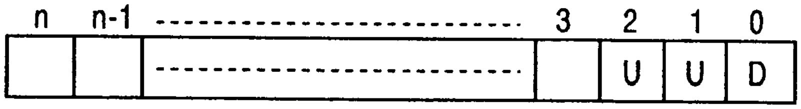
FIG. 5 is a diagram schematically showing one example of a PB pattern.
Figure 6:
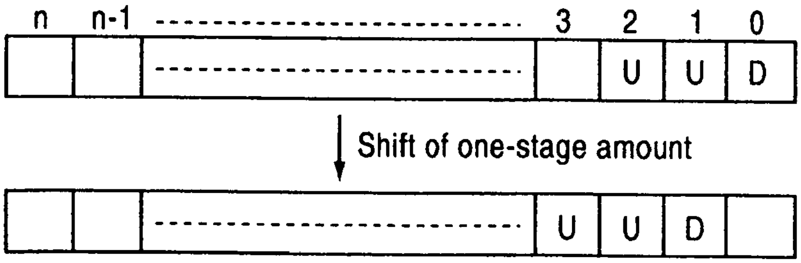
FIG. 6 is a diagram schematically showing a PB pattern shifting method.
Figure 7:
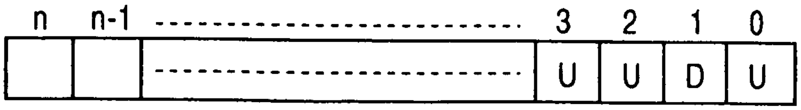
FIG. 7 is a diagram schematically showing one example of a PB pattern.
Figure 8:
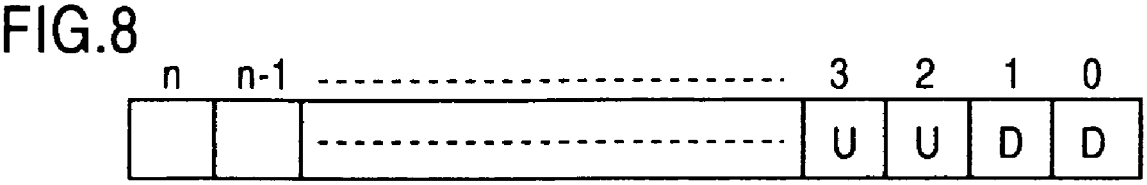
FIG. 8 is a diagram schematically showing one example of a PB pattern.

FIG. 4 is a flowchart showing the procedure of "PB pattern recording process", in which in step S31, the PB patterns having been recorded are read. The PB pattern is a data string in which PB variation history is recorded on a time series basis, and, as one example is shown in FIG. 5, an identifier "U" is registered in each stage in which an increase in PB value is detected, whereas an identifier "D" is registered in each stage in which a decrease in the PB value is detected. In step S32, the PB pattern read is shifted by one stage amount to the higher-order side, as shown in FIG. 6. In step S33, the this-time PB value and the last-time PB value are compared with each other. If the this-time PB value is greater than the last-time PB value, step S34 is entered, in which an identifier "U" representing the "increase" is registered in the PB pattern, as shown in FIG. 7. If the this-time PB value is equal to or smaller than the last-time PB value, step S35 is entered, in which an identifier "D" representing the "decrease" is registered in the PB pattern, as shown in FIG. 8. In step S36, the PB pattern is recorded.

Returning to FIG. 2, in step S12 it is determined whether the present temporary stage number is either of "9#" and "20#" or not. If the temporary stage number is neither "9#" nor "20#", the this-time process is finished. If the temporary stage number is either of "9#" and "20#", step S13 is entered, in which "stroke determining process" of assigning a main stage number to each stage on the basis of the relationship between the PB pattern and the temporary stage number is carried out.

Figure 9:
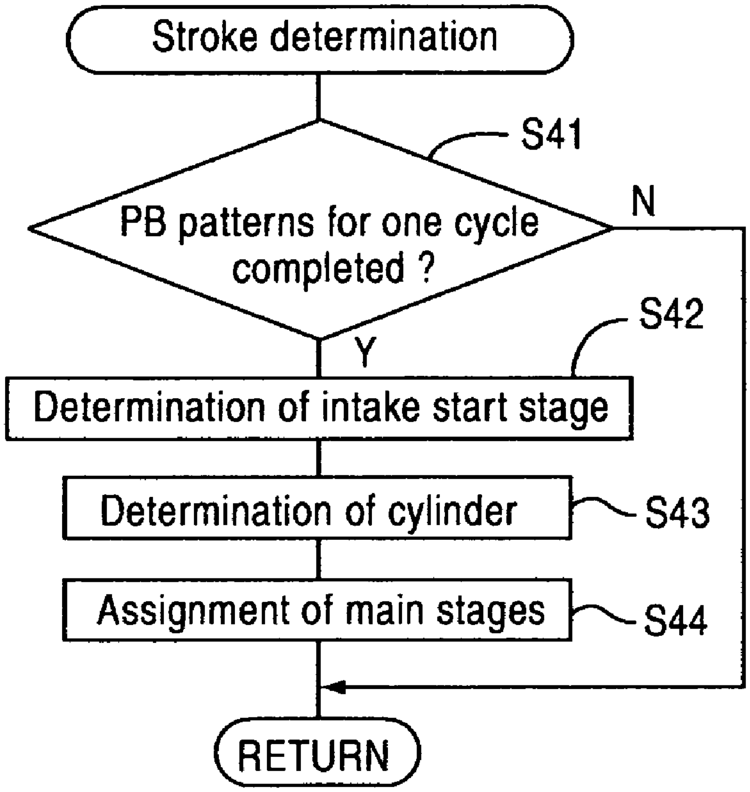
FIG. 9 is a flowchart showing the procedure of "stroke determination"

FIG. 9 is a flowchart showing the procedure of the "stroke determining process", in which in step S41, it is determined whether a one-cycle amount of PB patterns has been obtained or not. In this embodiment, such a setting is made that in step S10 shown in FIG. 2, PB patterns are recorded in the temporary stage number ranges of "5#" to "9#" and "16#" to "20#". In both ranges, if the registration of PB patterns has been completed, it is determined that a one-cycle amount of PB patterns has been obtained, and step S42 is entered. In step S42, the PB patterns are referred to, and the stage at which the PB value variation changes from increase "U" to decrease "D" is determined to be the intake start stage of each cylinder.

Figure 10:
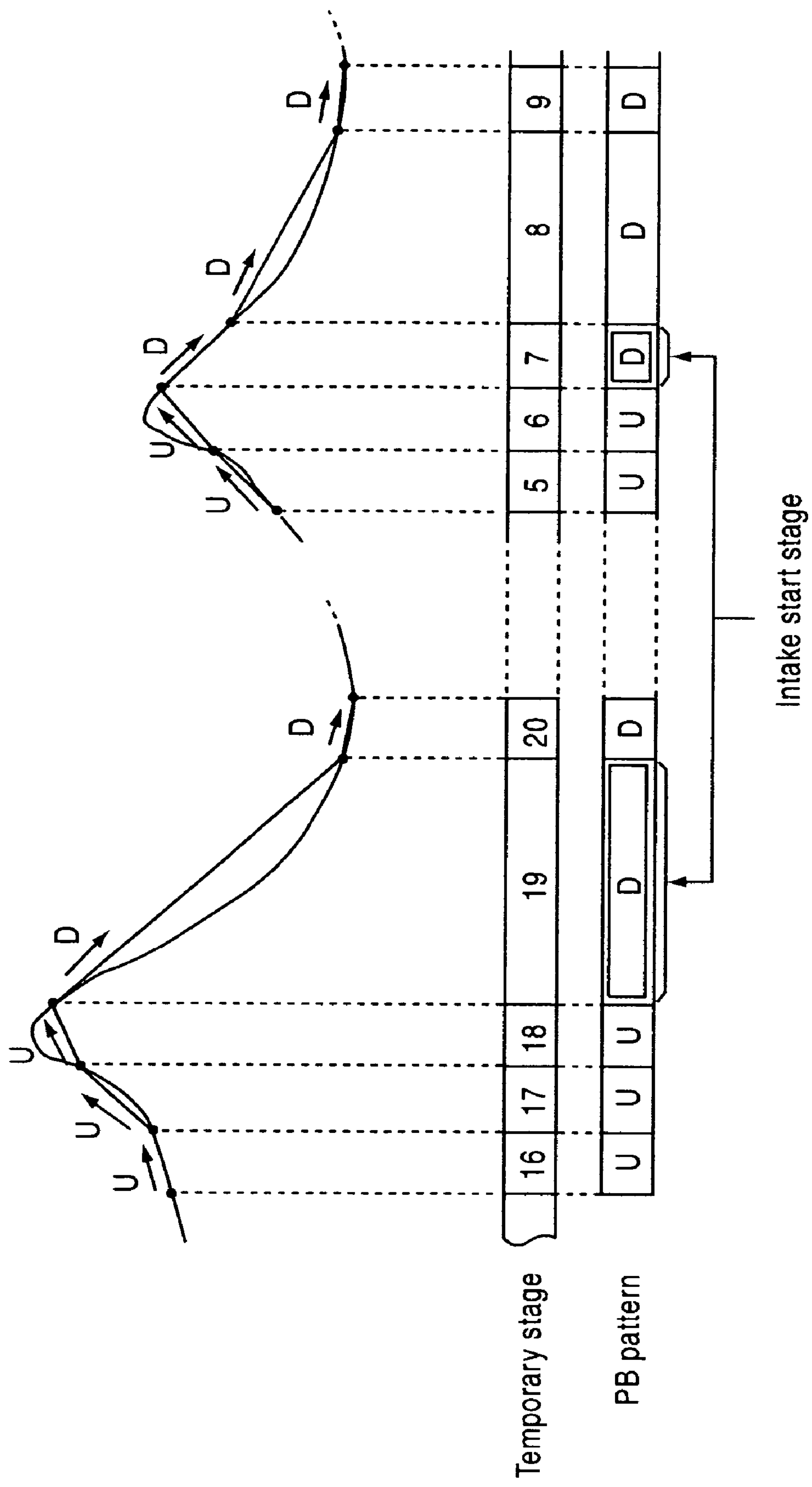
FIG. 10 is a diagram showing the relationships between temporary stage number and PB value and PB pattern.

FIG. 10 is a diagram showing the relationships between the temporary stage number and the PB value and the PB pattern. In this embodiment, the PB value changes from increase "U" to decrease "D" in the stages where the temporary stage number is "19#" and "7#", so that these two temporary stages are determined as the intake start stages of each cylinder.

In step S43, of the two intake start stages "19#" and "7#", the temporary stage "7#" on the spark advance side is determined as the intake start stage of the first cylinder, and the other temporary stage "19#" is determined as the intake start stage of the second cylinder. In step S44, main stage numbers are assigned to the stages in place of the temporary stage numbers so that the intake start stage of the first cylinder will be the main stage "7#" and the intake start stage of the second cylinder will be the main stage "19#".

Figure 3:
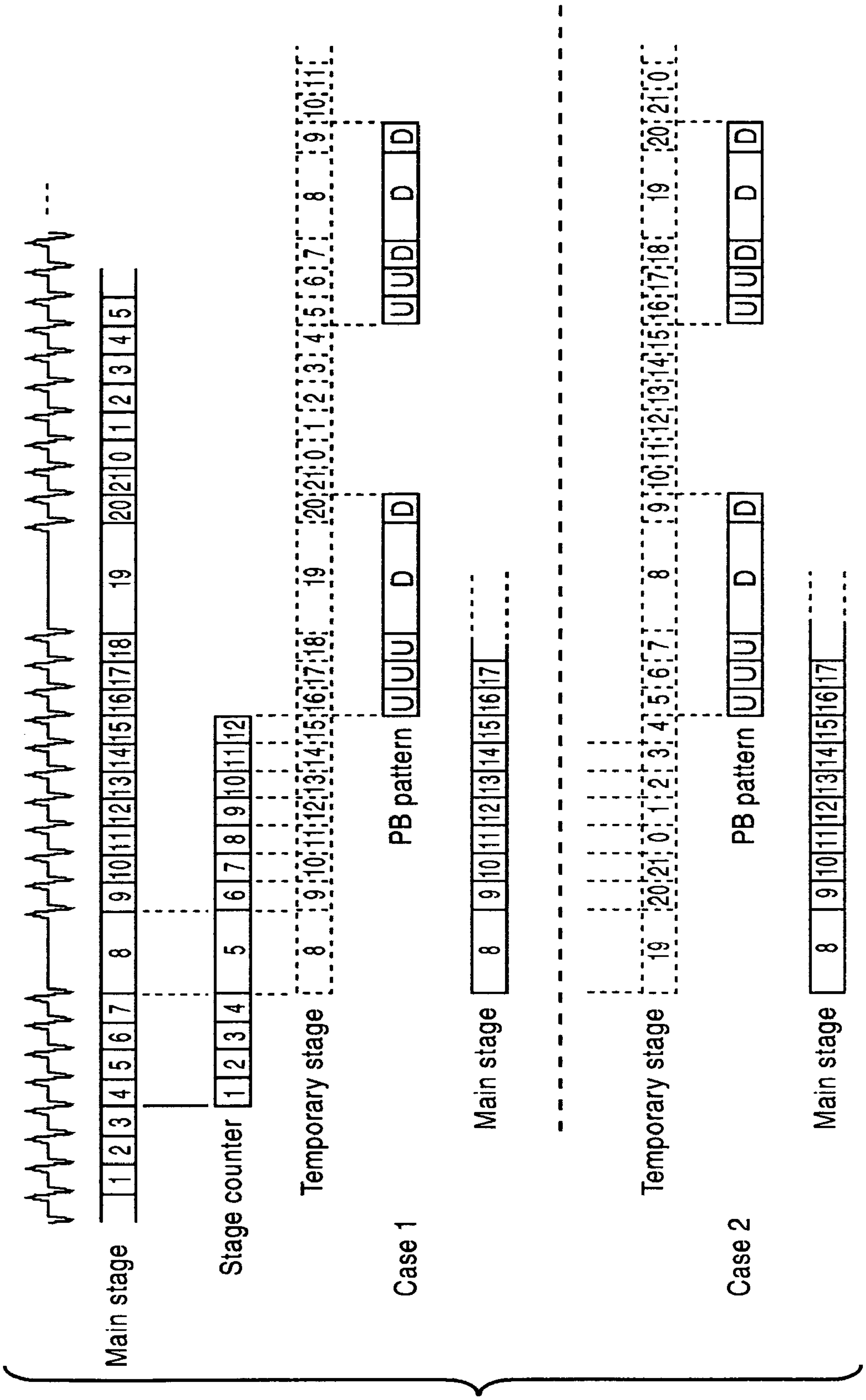
FIG. 3 is a timing chart showing the procedure of stroke determination.

Specifically, as has been shown as case 1 in FIG. 3, if the temporary stage "7#" is on the spark advance side relative to the temporary stage "19#", the temporary stage "7#" becomes the main stage "7#", so that the temporary stages will directly be the main stages.

On the other hand, as has been shown as case 2 in FIG. 3, if the stages where the temporary stage number is "8#" and "18#" are determined as the intake start stages of each cylinder and the temporary stage "18#" is on the spark advance side relative to the temporary stage "8#", main stage numbers are so assigned that the temporary stage "18#" becomes the main stage "7#".

Returning to FIG. 2, when the main stages are determined in this manner, the process thereafter is shifted from step S5 to step S14. In step S14, it is determined whether the main stage has been lost sight of, and, unless the main stage is lost sight of, the processes of steps S1 . . . S5, S14, and S1 are repeated.

When the main stage is thereafter lost sight of due to some cause, a flag or the like indicative of that the stage is indeterminate is registered in step S15, so that it is determined in the next step S5 that the stage is indeterminate, and step S6 and so on are entered, to repeat the above-mentioned processes.

Incidentally, while the description has been made of the case where the PB pattern is recorded in the temporary stage number ranges from "5#" to "9#" and from "16#" to "20#", various modifications are possible, for example, the stage range to be recorded may be shifted to the front or rear side or the stage number to be recorded may be increased or decreased so that the timing of change from increase to decrease in intake pressure will be included in the PB pattern recording period, according to the timing.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A stroke determination system for determining a stroke of a multi-cylinder four stroke cycle engine having ignition timing at irregular intervals, comprising;

means for detecting a phase of a crankshaft;

means for detecting intake pressure;

means for recording a variation pattern of said intake pressure, wherein said variation pattern includes identifiers indicating increases and decreases in said intake pressure;

means for determining an intake start timing of each cylinder based on said variation pattern of said intake pressure; and means for determining the stroke based on a corresponding relationship between said intake start timing of each cylinder and said phase of said crankshaft.

2. A stroke determination system for a four stroke cycle engine as set forth in claim 1, wherein said means for recording said variation pattern records only said variation pattern of said intake pressure in a predetermined phase period of said crankshaft.

3. A stroke determination system for a four stroke cycle engine as set forth in claim 2, wherein increases and decreases in said intake pressure are recorded in said variation pattern on a time series basis.

4. A stroke determination system for a four stroke cycle engine as set forth in claim 3, wherein said means for determining said intake start timing determines the timing of change from the increase to the decrease of said intake pressure in said variation pattern, as said intake start timing.

5. A stroke determination system for a four stroke cycle engine as set forth in claim 2, wherein said engine is a V-type two cylinder engine.

6. A stroke determination system for a four stroke cycle engine as set forth in claim 5, wherein said means for determining the stroke includes:

means for comparing spark advances of said intake start timings;

means for corresponding said intake start timing on one side to a predetermined stroke, based on the results of said comparison; and means for corresponding each phase in two-period amount of said crankshaft to each stroke of said engine, based on the corresponding relationship between said intake start timing on one side and said predetermined stroke.

7. A stroke determination system for a four stroke cycle engine as set forth in claim 1, wherein said engine is a V type two cylinder engine.

8. A stroke determination system for a four stroke cycle engine as set forth in claim 7, wherein said means for determining the stroke includes:

means for comparing spark advances of said intake start timings;

means for corresponding said intake start timing on one side to a predetermined stroke, based on the results of said comparison; and means for corresponding each phase in two-period amount of said crankshaft to each stroke of said engine, based on the corresponding relationship between said intake start timing on one side and said predetermined stroke.

9. A stroke determination system for a four stroke cycle engine as set forth in claim 1, wherein increases and decreases in said intake pressure are recorded in said variation pattern on a time series basis.

10. A stroke determination system for a four stroke cycle engine as set forth in claim 9, wherein said engine is a V-type two cylinder engine.

11. A stroke determination system for a four stroke cycle engine as set forth in claim 10, wherein said means for determining the stroke includes:

means for comparing spark advances of said intake start timings;

means for corresponding said intake start timing on one side to a predetermined stroke, based on the results of said comparison; and means for corresponding each phase in two-period amount of said crankshaft to each stroke of said engine, based on the corresponding relationship between said intake start timing on one side and said predetermined stroke.

12. A stroke determination system for a four stroke cycle engine as set forth in claim 9, wherein said means for determining said intake start timing determines the timing of change from the increase to the decrease of said intake pressure in said variation pattern, as said intake start timing.

13. A stroke determination system for a four stroke cycle engine as set forth in claim 12, wherein said engine is a V-type two cylinder engine.

14. A stroke determination system for a four stroke cycle engine as set forth in claim 13, wherein said means for determining the stroke includes:

means for comparing spark advances of said intake start timings;

means for corresponding said intake start timing on one side to a predetermined stroke, based on the results of said comparison; and means for corresponding each phase in two-period amount of said crankshaft to each stroke of said engine, based on the corresponding relationship between said intake start timing on one side and said predetermined stroke.

* * * * *